United States Patent Office 3,299,015
Patented Jan. 17, 1967

3,299,015
METHOD FOR PREPARING α,β-UNSATURATED TERTIARY PHOSPHINE OXIDES AND POLYMERS THEREOF
Robert C. Miller, Chicago, Ill., assignor to E. I. du Pont de Nemours and Company, Wilmington, Del., a corporation of Delaware
No Drawing. Filed June 15, 1960, Ser. No. 36,127
24 Claims. (Cl. 260—80)

This invention relates to a new class of organo-phosphorus compounds. More particularly, it relates to new α,β-unsaturated tertiary phosphine oxides, their polymers, and a method for their preparation.

Growing interest in the use of organo-phosphorus compounds in fuel, lubricants, textile coatings, fireproofing compositions, etc., has given impetus to the search for new organo-phosphorus compounds having unusual properties. Therefore, it is an object of this invention to provide organo-phosphorus compounds with a high order of chemical stability. It is a further object of the invention to provide tertiary phosphine oxides in which phosphoryl groups and carbon-carbon double bonds are in conjugation. It is a still further object of the invention to provide new organo-phosphorus compounds useful in fireproofing compositions and fire-retardant polymers. Other and additional objectives will become apparent from a consideration of the ensuing specification and claims.

The objects of this invention have been accomplished by providing an α,β-unsaturated tertiary phosphine oxide having the structural formula:

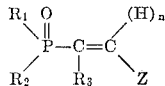

wherein each of $R_1$ and $R_2$ is an aryl, alkyl, aralkyl or alkaryl hydrocarbon radical, attached to phosphorus through carbon-phosphorus bonds; $R_3$ may be hydrogen or lower alkyl (1 to 5 carbon atoms); $n$ is an integer less than two, including zero; and Z may be (1) hydrogen, (2) the radical

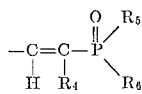

wherein $R_4$ is hydrogen or lower alkyl and each $R_5$ and $R_6$ is an aryl, alkyl, aralkyl or alkaryl hydrocarbon radical attached to phosphorus through carbon-phosphorus bonds, or (3) provided that $n=0$, the methylene radical, $=CH_2$.

Particular subclasses of these new compounds are represented by the structural formulae:

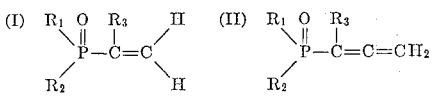

and

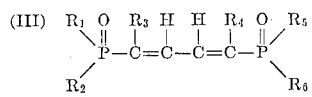

in which the letter designations correspond to those defined above.

The generic term "tertiary phosphine oxide" employed herein includes compounds corresponding to the general formula, $R_3P=O$, where the R's represent organic radicals linked to phosphorus through carbon-to-phosphorus bonds. Compounds of subclass I are defined as monovinyl tertiary phosphine oxides or phosphinylethylenes; compounds of subclass II are defined as phosphinylallenes; and compounds of subclass III are defined as 1,4-bis-(phosphinyl)-butadienes. Phosphinyl denotes the group having the structure

Typical compounds coming within the scope of this invention are: diphenylvinylphosphine oxide,

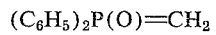

phenylethylvinylphosphine oxide,

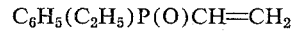

diethylphosphinylallene, $(C_2H_5)_2P(O)CH=C=CH_2$; bis-1,4 - (diphenylphosphinyl) - butadiene,

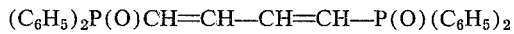

diethylpropenylphosphine oxide,

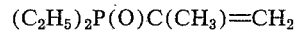

dibenzylvinylphosphine oxide,

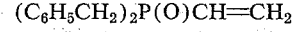

and bis-(p-methylphenyl)-vinylphosphine oxide

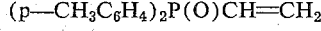

Homopolymers and copolymers are also provided in accordance with this invention. For example, the monomers of subclasses I, II, and III, respectively, polymerize as follows:

(1) 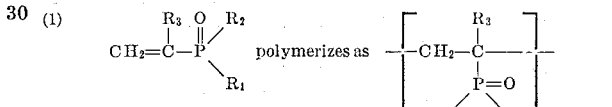

(2) 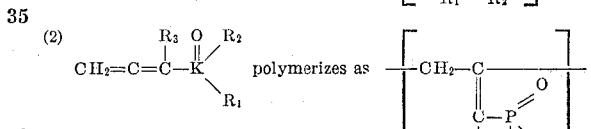

(3) 

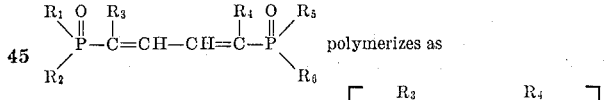

and/or

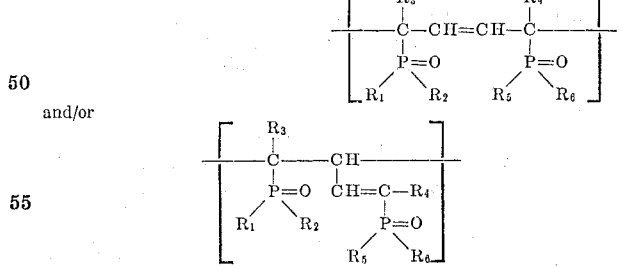

wherein each of $R_1$, $R_2$, $R_5$ and $R_6$ is aryl, alkyl, aralkyl or alkaryl and each of $R_3$ and $R_4$ is hydrogen and lower alkyl. In all such polymers, the phosphine oxide groups extend from the main polymer chain.

The novel monomeric compositions of this invention are prepared by reacting (1) a disubstituted halophosphine of the formula:

wherein $R_1$ and $R_2$ are aryl, alkyl, aralkyl or alkaryl and

X is either chloro, bromo, or iodo; and (2) one of the alcohols of the formulae:

(a) $\quad$ X—CH$_2$—CH—OH
$\qquad\qquad\qquad\quad$ |
$\qquad\qquad\qquad\quad$ R$_3$ (b) $\quad$ HO—CH—C≡C—H
$\qquad\qquad\quad$ |
$\qquad\qquad\quad$ R$_3$ or (c) $\quad$ HO—CH—C≡C—CH—OH
$\qquad\qquad\quad$ | $\qquad\qquad$ |
$\qquad\qquad\quad$ R$_3$ $\qquad\qquad$ R$_4$ wherein X is either chloro, bromo, or iodo; and R$_3$ and R$_4$ are hydrogen or lower alkyl. The reaction is carried out in the presence of a base and at a temperature between about −5° and about 25° C.

The reaction is illustrated by the following equations:

Base + R$_2$PX + ROH ⟶ [R$_2$P—O—R] + Base⋅HX $$[R_2P\text{—}O\text{—}R] \xrightarrow[\text{catalyst}]{\text{Heat and/or}} R_2\overset{\overset{O}{\|}}{P}R$$

The R groups in these equations conform to the aryl, alkyl, aralkyl and alkaryl radicals of the disubstituted halophosphines and alcohols utilized in the reaction. The halophosphine employed may be derived from chlorine, bromine or iodine and have as substituents any organic radicals attached to the phosphorus through carbon-phosphorus bonds. For example, diethylchlorophosphine and phenylethylbromophosphine are operable in the reaction. The alcohols may be substituted or unsubstituted and/or may contain more than one hydroxyl group. The formation of an ester intermediate in the reaction may or may not be apparent, since rearrangement to the phosphine oxide can occur spontaneously. Rearrangement can also be brought about catalytically, as for example, by warming the ester with a crystal of iodine. The rearrangement usually is accompanied by the evolution of large amounts of heat.

All reactions in the following are conducted under a nitrogen atmosphere.

*Example I*

Diphenylvinylphosphine oxide was prepared as follows: A cold solution containing 16.1 grams (0.20 mole) of redistilled 2-chloroethanol, 15.8 grams (0.20 mole) of anhydrous pyridine and 350 ml. of anhydrous ether is treated in a nitrogen atmosphere with 44.1 grams (0.20 mole) of diphenylchlorophosphine. The addition is carried out with cooling and continuous stirring at a temperature between −4 and −1° C. over a 10-minute period. The mixture is allowed to stand at room temperature with stirring for 45 minutes, after which the the pyridine hydrochloride which forms is removed by filtration.

The solvent is stripped from the filtrate and the residue heated under reduced pressure (1 mm. Hg) to about 145° C. At this temperature, a vigorous exothermic reaction takes place. When the mixture cools, a tacky white solid separates out. The solid is purified by recrystallization from a 1:2 benzene-hexane mixture to yield 35.5 grams of crude diphenyl-2-chloroethylphosphine oxide (67% conversion). After further recrystallization from n-heptane, a sample of the compound melts between 125.0 and 126.4° C.

This product is then dehydrohalogenated. To a mixture containing 22.6 grams of the somewhat impure 2-chloro-ethyldiphenylphosphine oxide in 100 ml. of ethanol is added 5.10 grams of potassium hydroxide in 300 ml. of ethanol. The addition is followed by refluxing for 15 minutes. Potassium chloride separates out and after filtration and evaporation of the solvent, a white solid is obtained which is purified by extraction for 7 hours with boiling heptane. Recrystallization from n-heptane gives white, plate-like crystals of diphenylvinylphosphine oxide, (C$_6$H$_5$)$_2$P(O)CH=CH$_2$, melting over the range 117.5 to 118.5° C.

Analyses confirm the composition of the final product. Calc'd for (C$_6$H$_5$)$_2$P(O)CH=CH$_2$: C, 73.67%; H, 5.74%; P, 13.57%. Found: C, 73.28%; H, 5.82%; P, 13.18%. The structure of the compounds is verified by infrared spectrophotometric analysis. As additional evidence, hydrogenation of the compound yields a product (C$_6$H$_5$)$_2$P(O)C$_2$H$_5$, whereas bromination produces (C$_6$H$_5$)$_2$P(O)CHBr—CH$_2$Br.

*Example II*

Diphenylphosphinylallene is prepared in the following manner: A cold mixture containing 11.2 grams (0.20 mole) of redistilled propargyl alcohol, 15.8 grams (0.20 mole) of dry pyridine and 350 ml. of anhydrous ether is treated with 44.1 grams (0.20 mole) of diphenylchlorophosphine. The addition is carried out with cooling and continuous stirring at a temperature between −5 and +5° over a 15-minute period. The mixture is allowed to stand at room temperature with stirring until the temperature reaches 20° C. The very dense white precipitate which forms is removed by filtration, washed with ether, and separated from the water-soluble pyridine hydrochloride by stirring with water at room temperature. The solid remaining is dissolved in boiling ether, decolorized with charcoal and reprecipitated with 1.5–2 volumes of n-hexane. Shiny white leaflets of diphenylphosphinylallene, (28.0 grams—58.5% conversion), (C$_6$H$_5$)$_2$P(O)CH=C=CH$_2$, melting over the range 107 to 108.5° C. are obtained.

Analyses confirm the composition of the compound. Calc'd for (C$_6$H$_5$)$_2$P(O)CH=C=CH$_2$: C, 74.99%; H, 5.45%; P, 12.90%. Found: C, 75.03%; H, 5.55%; P, 12.79%. The structure of the compound is verified by infrared spectrophotometric analysis. Unsaturation is indicated since the product decolorizes both KMnO$_4$ and Br$_2$ solutions.

Similar compositions are provided when phenylethylchlorophosphine is substiuted for the diphenylchlorophosphine.

*Example III*

1,4-bis-(diphenylphosphinyl)-butadiene is prepared as follows: A cold mixture containing 4.88 grams (0.057 mole) of 1,4-butynediol, 9.0 grams (0.114 mole) of pyridine and 300 ml. of dry ether is treated with 25.0 grams (0.114 mole) of diphenylchlorophosphine. The addition is carried out with cooling and continuous stirring at a temperature between −5 and +5° C. over a 15-minute period. The mixture is allowed to stand with stirring at room temperature for 1.5 hours, and a white solid is then removed by filtration. The solid is extracted with water to remove the soluble amine hydrochloride, and the remaining crystals are dried at 60° C. for 4 hours. The dried product is recrystallized from a 3:1 mixture of benzene and n-hexane. The long, white, needle-like crystals obtained contain a molecule of benzene of crystallization and hence are placed in a drying pistol at 1 mm. of Hg pressure and at the temperature of refluxing toluene for 4 hours. Porous, white, opaque needles of 1,4-bis-(diphenylphosphinyl)-butadiene, (13.9 grams —53.9% conversion), (C$_6$H$_5$)$_2$P(O)CH=CH—CH=CH—P(O)(C$_6$H$_5$)$_2$ melting over the range 182.5–184.0° C. are obtained.

Its composition as determined by chemical analyses is consistent with the formula (C$_6$H$_5$)$_2$P(O)CH=CH—CH=CH—P(O)(C$_6$H$_5$)$_2$ Nuclear magnetic resonance data support the structure.
Calculated: C, 74.00%; H, 5.32%; P, 13.63%. Found: C, 74.04%; H, 5.30%; P, 13.63%.

Example IV

Diethylvinylphosphine oxide is prepared as follows: A solution containing 25.0 grams (0.31 mole) of 2-chloroethanol, 25.0 grams (0.32 mole) of dry pyridine and 200 ml. of dry ether is treated with 34.8 grams (0.28 mole) of diethylchlorophosphine. The addition is carried out with cooling and constant stirring at a temperature between −5° C. and +5° C. over a period of 20 minutes. The mixture is allowed to stand at room temperature with stirring for one hour, and the insoluble white amine hydrochloride is then removed by filtration. The ether is stripped from the filtrate and the residue distilled in vacuo, the desired product being collected between 46° and 47° C. at a pressure of 2.0 to 2.2 mm. The product obtained is identified as the phosphinite ester intermediate, $(C_2H_5)_2P—O—CH_2CH_2Cl$, by analysis and various chemical tests.

A 23.1 gram sample of the 2-chloroethyl diethylphosphinite is heated gently to a temperature of 110° C. in a 100 ml. flask attached to a Vigreaux column. When the heat is removed the temperature continues to rise, and at 136° C. a violent reaction occurs, during which the temperature rises very rapidly. After cooling, the mixture is reheated at 160° C. for 20 minutes. Distillation is carried out at 6 mm. pressure and the fraction boiling between 102 and 105° C. is collected. The crystalline product which separates from this fraction at room temperature is washed with n-hexane and dried. The product melts at 68.1 to 69.5° C. and analyzes as diethyl-2-chloroethylphosphine oxide $(C_2H_5)_2P(O)CH_2CH_2Cl$.

Dehydrohalogenation occurs when 5.65 grams of the diethyl-2-chloroethylphosphine oxide is refluxed for 4 hours with a mixture containing 10 grams of triethylamine, 100 ml. of dry benene and 20 ml. of dry ether. The amine hydrochloride precipitate which forms is removed by filtration and, on evaporation of the filtrate, an oil remains. The oil is dissolved in 200 ml. of boiling hexane, decolorized with charcoal, and the solution evaporated to 50 ml. Deliquescent needles of diethylvinylphosphine oxide, $(C_2H_5)_2P(O)CH=CH_2$, which melts in a sealed tube over a temperature range of 40.5 to 41.2° C., are obtained (conversion −25%).

Chemical analyses confirm the composition of the final product:

Calc'd for $(C_2H_5)_2P(O)CH=CH_2$: C, 54.53%; H, 9.92%; P, 23.24%. Found: C, 54.11%; H, 9.95%; P, 23.69%. Infrared spectrophotometric analysis verifies its structure.

Example V

Diethylphosphinylallene is prepared in the following way: Diethylchlorophosphine in an amount of 25.6 grams (0.21 mole) is dissolved in 50 ml. of dry ether. The resulting solution is added to a mixture containing 12.0 grams (0.22 mole) of propargyl alcohol, 19.0 grams (0.24 mole) of dry pyridine and 250 ml. of dry ether. The addition is carried out with continuous stirring at a temperature between −5 and +5° C. over a period of 30 minutes. The mixture is allowed to stand with stirring at room temperature for one hour, after which the precipitate of amine hydrochloride is removed by filtration. The filtrate is evaporated on a steam bath until a winered oily liquid remains. The red oil is distilled at reduced pressure, the desired fraction being collected between 93 and 99° C. at 1 mm. pressure. This fraction darkens on standing and is redistilled at a pressure of 0.22 to 0.25 mm. The fraction boiling between 98 and 99° C. crystallizes on standing to deliquescent, white needles of diethylphosphinylallene, which melts over the temperature range 28 to 31° C. The yield of doubly distilled material is 25.8% of theoretical.

Calc'd for $(C_2H_5)_2P(O)CH=C=CH_2$: C, 58.32%; H, 9.09%; P, 21.49%. Found: C, 57.72%; H, 9.28%; P, 21.41%. Infrared spectrophotometric analysis verifies its structure.

Example VI 1,4-bis-(diethylphosphinyl)-butadiene is prepared in the following manner: A mixture of 13.5 grams (0.17 mole) of pyridine, 7.3 grams (0.085 mole) of 1,4-butynediol and 250 ml. of dry ether is treated with 20 grams (0.17 mole) of diethylchlorophosphine in 50 ml. of dry ether. The addition is carried out with continuous stirring at a temperature between −5 and +5° C. over a period of 30 minutes. The mixture is allowed to stand at room temperature with stirring for one hour and the precipitate is removed by filtration. The precipitate is then placed in 250 ml. of benzene and stirred for 30 minutes. The insoluble amine hydrochloride is filtered out and the filtrate evaporated until an oil remains. This oil is dissolved in 25 ml. of n-hexane and the solution is cooled to yield a yellow oil which crystallizes slowly into deliquescent needles. Recrystallization from n-heptane gives the crystalline 1,4-bis-(diethylphosphinyl)-butadiene,

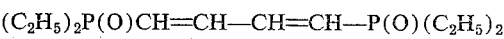

which melts over the range 81 to 83.5° C. The yield is 26.0% of theoretical.

The composition of the product is verified by chemical analysis:

Calculated for

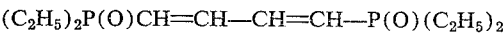

C, 54.95%; H, 9.16%; P, 23.62%. Found: C, 54.97%; H, 9.20%; P, 23.25%.

Example VII

Di-n-octylvinylphosphine oxide is prepared in the following way: A solution of 21.7 grams (0.065 mole) of di-n-octylbromophosphine in 50 ml. of dry ether is added to a mixture containing 7.90 grams (0.065 mole) of N,N-dimethylaniline, 5.20 grams (0.065 mole) of 2-chloroethanol and 200 ml. of dry ether, cooled in an acetone-ice mixture. The addition is carried out with continuous stirring over a 15-minute period. After standing at room temperature with stirring for one hour, the insoluble amine salt which forms is removed by filtration. The ether is removed from the filtrate and the residue is heated to 165° C. at 1 mm. Hg pressure where an exothermic reaction takes place. After the reaction subsides, the mixture is heated to 175° C. for 15 minutes and cooled. Cooling produces 16.8 grams of a semi-solid mass which is extracted with hexane. The hexane solution is distilled at reduced pressures (about 1 mm.) using a steam jacketed condenser. The fraction boiling between 165 and 183° C. at 0.7 to 0.8 mm. of Hg pressure solidifies on cooling. This solid is recrystallized from n-hexane, giving the white, crystalline di-n-octylvinylphosphine oxide which melts over the range 62.5 to 63.5° C. The yield is 20% of theoretical. Analyses are consistent with the formula $(C_8H_{17})_2P(O)CH=CH_2$.

Calc'd for $(C_8H_{17})_2P(O)CH=CH_2$: C, 71.95%; H, 12.41%; P, 10.31%. Found: C, 71.91%; H, 12.54%; P, 10.46%. Infrared data verifies the vinyl structure.

Example VIII

Di-n-octylphosphinylallene is prepared in the following way: A solution of 20.36 grams (0.0603 mole) of di-n-octylbromophosphine in 50 ml. of dry ether is added to a mixture containing 3.50 grams (0.062 mole) of propargyl alcohol, 7.50 grams (0.062 mole) of N,N-dimethylaniline and 200 ml. dry ether. The addition is carried out with continuous stirring at a temperature between −5 and +5° C. over a 28 minute period. The resulting white slurry is allowed to stand at room temperature with stirring for one hour and then is filtered. The desired product is contained in both the precipitate and the filtrate. The precipitate is extracted with cold water to remove the amine salt and the filtrate is evaporated to remove the solvent. The solids remaining from each of these treatments are combined and recrystallized from n-hexane, yielding 12.0 grams (63.7% conversion) of di-n-octylphosphinylallene which melts between 74.2 and 75.1° C. Analyses are consistent with the formula $$(C_8H_{17})_2P(O)CH=C=CH_2$$

Calc'd for $(C_8H_{17})_2P(O)CH=C=CH_2$: C, 73.03%; H, 11.49%; P, 9.91%. Found: C, 73.08%; H, 11.96%; P, 9.95%. Infrared data indicates the presence of the conjugated allene arrangement.

Example IX 1.4-bis-(di-n-octylphosphinyl)-butadiene is prepared as follows: A solution of 19.33 grams (0.057 mole) of di-n-octylbromophosphine in 50 ml. of dry ether is added with stirring over a 25-minute period to a chilled mixture containing 7.04 grams (0.058 mole) of N,N-dimethylaniline, 2.50 grams (0.029 mole) of 1,4-butynediol and 200 ml. of dry ether. The resulting mixture is allowed to stand with stirring at room temperature for one hour and then the ether is removed by evaporation. The residue is extracted with 150 ml. of water and 18 grams of a white solid remains. The white solid is purified by a series of treatments. It is first recrystallized twice from n-hexane. This is followed by adsorption from a carbon tetrachloride solution onto an alumina chromatographic column and elution using a 3:1 carbon tetrachloride-benzene mixture. The eluate is evaporated and the solid residue is finally recrystallized from n-hexane. A white product (8.9 grams) melting at 86.5 to 87.6° C. is obtained.

Analyses are consistent with the formula $$(n-C_8H_{17})_2P(O)CH=CH-CH=CH-P(O)(n-C_8H_{17})_2$$

Calc'd for $[(n-C_8H_{17})_2P(O)CH=CH]_2$: C, 72.19%; H, 12.12%; P, 10.34%. Found: C, 72.25%; H, 12.24%; P, 10.35%.

Example X

A mixture containing a 4.38 to 1 weight ratio of methylmethacrylate to diphenylvinylphosphine oxide and 1.5 mole percent benzoyl peroxide is placed in a loosely stoppered bottle under nitrogen and gently heated in a water bath until the mixture thickens. After cooling, the semi-gelatinous mixture is heated at 100° C. for 1–2 hours. The copolymer then is precipitated from benzene with cyclohexane three times and dried under vacuum at 90° C. for several hours. Analysis shows the copolymer to contain 5.65 mole percent of the diphenylvinylphosphine oxide monomer. The molecular weight, as determined by the boiling point elevations of benzene solutions, is 5400.

The results of similar preparations using other of the phosphine oxides are tabulated below:

COPOLYMERS OF METHYL METHACRYLATE AND PHOSPHORYL-CONTAINING OLEFINS

| Weight Ratio of Monomers | Mole Percent Phosphine Oxide in Copolymer | Molecular Weight |
|---|---|---|
| 29.1/1—MMA/DPVPO | 1.61 | 3,000 |
| 4.41/1—MMA/BDPPB | 3.10 | |
| 4.17/1—MMA/DPPA | 2.33 | |
| 8.77/1—MMA/DPVPO | 2.95 | 5,300 |
| 21.9/1—MMA/DPVPO | 1.51 | 3,000 |
| 6.0/1—MMA/DEVPO | 5.70 | |

Legend: MMA—Methyl methacrylate; DPVPO—Diphenylvinylphosphine oxide; BDPPB—1,4-bis-(diphenylphosphinyl)-butadiene; DPPA—Diphenylphosphinylallene; DEVPO—Diethylvinylphosphine oxide.

Example XI

The procedure of Example X is applied to monomer mixtures containing 0.1% by weight dibenzoyl peroxide as catalyst. The results are summarized:

| Weight Ratio of Monomers | Mole Percent Phosphine Oxide in Copolymer | Av. Molecular Weight (B.P. Elevation of benzene) |
|---|---|---|
| 8.78/1—MMA/DPVPO | 0.88 | 5,390 |
| 21.3/1—MMA/DPVPO | 0.46 | 2,970 |

Example XII

A mixture containing 20.0 grams of styrene, 4.8 grams of diphenylvinylphosphine oxide and 0.10 grams of benzoyl peroxide is placed in a polymer tube in a nitrogen-filled dry box. The tube is sealed and kept in the dark overnight. The tube is then placed in a 50° C. water bath and shaken until solution occurs. The water is then heated to boiling and the boiling is maintained for 10 hours. The tube content is dissolved in benzene and reprecipitated three times with methyl alcohol. The product (10 grams) contains 3.94 mole percent of the phosphine oxide monomer and has a molecular weight of 4760, as determined by boiling point elevation in benzene.

The results of similar preparations, using the indicated proportions of reactants are tabulated below:

| Weight (g.) Ratio of Monomers | Weight (g.) of Benzoyl Peroxide | Mole Percent Phosphine Oxide in Copolymer | Molecular Wt. B.P. Elev. | Molecular Wt. Light Scatter. |
|---|---|---|---|---|
| 20/4—MMA/DPVPO | 0.02 | 3.16 | 4,740 | 180,000 |
| 10/1—Styrene/DEVPO | 0.055 | 3.16 | 4,340 | 210,000 |
| 10/1—MMA/DEVPO | 0.011 | 1.32 | 7,870 | 300,000 |

Example XIII

The procedure of Example XII is applied to a mixture containing 15 grams of methyl methacrylate, 5 grams of diphenylvinylphosphine oxide and 2.1 grams of benzoyl peroxide, except that the polymeric product is reprecipitated with n-hexane. The product (23.5 grams) displays good fire retarding properties and contains 4.65 mole percent of the phosphine oxide monomer. The average molecular weight is 1430.

Example XIV

The solution remaining from the third hexane precipitation of Example XIII, containing low molecular weight polymer and unreacted monomer, is stripped of solvent, leaving a white viscous oily residue which is heated with 22.6 grams of ethylene glycol and 0.35 gram of litharge to 150° C. The mixture is cooled and the unreacted glycol is removed under vacuum. The residue is heated to a temperature of 250° C. and cooled. The resulting product is dissolved in boiling benzene and reprecipitated twice with n-hexane. The dried product contains 5.38% by weight phosphorus, or about 22 mole percent of the phosphine oxide monomer.

Example XV

The polymer product of Example XIII (10 grams) is refluxed for two hours with 22.6 grams of ethylene glycol at 150° C. The unreacted ethylene glycol is stripped from the reaction mixture under vacuum, and the residue is heated to 200° C. and cooled, yielding 6.55 grams of a tan solid. The solid is dissolved in benzene and precipitated with n-hexane three times. The product contains 1.38% by weight phosphorus (about 4.7 mole percent phosphine oxide monomer) and has an average molecular weight of 5235, as determined by boiling point elevation in benzene.

Example XVI

A mixture containing 10 grams of vinyl acetate, 10 ml. of ethyl acetate, 3.3 grams of diphenylvinylphosphine oxide and 0.2 gram of benzoyl peroxide is refluxed for 18 hours. After stripping off the excess ethyl acetate, the polymer is precipitated three times from benzene with n-hexane. The polymer product contains 2.76% by weight phosphorus (about 8 mole percent of the phosphine oxide monomer) and has an average molecular weight of 2130, as determined by boiling point elevation in benzene.

Example XVII

Diphenylvinylphosphine oxide (3.94 grams) is refluxed for 18 hours with 0.03 gram of metallic sodium in 75 ml. of absolute ethanol. After the solution is cooled and evaporated under nitrogen until about 25 ml. remains, n-octane (30 ml.) is added and the mixture is evaporated under nitrogen until about 10 ml. remains. A brown oil is obtained which is dissolved in benzene and precipitated by n-hexane. An oil still remains. This oil is dissolved in 15 ml. of benzene and 400 ml. of n-heptane are added all at once, and whitish solid precipitates out. After drying, analyses indicate the solid to be a homopolymer of diphenylvinylphosphine oxide having a molecular weight of about 1100, as determined by boiling point elevation in dichloroethylene.

Suitable disubstituted halophosphines which may be employed in the process of this invention are those containing chlorine, bromine or iodine as the halogen substituent. The two organic substituents are linked to the phosphines through carbon-to-phosphorus bonds. The organic radicals may be aryl, alkyl, aralkyl or alkaryl and may be alike or different. Additional operable disubstituted halophosphines include diethylbromophosphine, diphenylbromophosphine, di-n-octylchlorophosphine, phenylethylchlorophosphine, diphenyliodophosphine, and the like. The halophosphines are prepared by known techniques.

Suitable alcohols include 2-chloroethanol, propargyl alcohol, butynediol and their derivatives, i.e.,

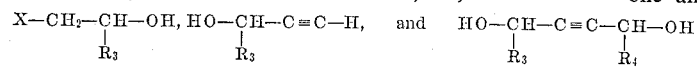

$$X-CH_2-CH(R_3)-OH,\ HO-CH(R_3)-C\equiv C-H,\ \text{and}\ HO-CH(R_4)-C\equiv C-CH-OH$$

in which chlorine, bromine, or iodine, and the R's are hydrogen or lower alkyl.

The reaction may be carried out in a suitable organic solvent, such as ether or benzene, which is inert with respect to the reactants and products. Although an inert solvent is preferred, in certain instances it may be possible to employ excesses of the halophosphines reactant as solvent. Since the halophosphines are particularly sensitive to oxygen and moisture, a dry atmosphere, inert to the system, is maintained throughout. Although dry nitrogen is very convenient for this purpose, any chemically inert gas may be used.

The reaction between the halophosphine and the alcohol is ordinarily carried out at a temperature between —5° and 25° C. Higher temperatures may be used if the particular materials involved are not decomposed. However, when it is desired to separate the ester intermediate, lower temperatures are preferred since heat alone effects isomerization to a tertiary phosphine oxide. For example, in the preparation of diphenylphosphinylallene, the tertiary phosphine oxide is obtained directly although temperatures are maintained below 30° C.

The reaction is carried out in the presence of a base since it is desirable to remove or otherwise tie up the hydrogen halide which forms as a product. This is conveniently accomplished by adding to the reaction system bases such as the tertiary amines, pyridine, N-methyl piperidine, N-ethyl piperidine, N,N'-dimethylpiperazine, pyrazine, quinoline, N,N-dimethylaniline, N,N-diethylaniline, triethylamine, and the like.

The rearrangement of the intermediate product, which apparently is a phosphinite ester, is accomplished either catalytically or by heat alone by a conventional Arbuzov rearrangement such as shown in Kosolapoff, G. M., "Organophosphorus Compounds," John Wiley and Sons, Inc., New York, N.Y., 1950, at pages 102–103. For example, catalytic rearrangement occurs where the esters are warmed in the presence of a crystal of iodine or a small amount of alkyl halide. Thermal rearrangement can be brought about by heating at high pressure, i.e., heating in a sealed tube; heating at atmospheric pressure, preferably when the ester is dissolved in a solvent; or heating at reduced pressures. Heating in a sealed tube is the least desirable since many side-products result.

Suitable solvents for rearrangement at atmospheric pressure are mesitylene, toluene, anisole and others containing no active hydrogen. Refluxing mesitylene (155° C.) has been used effectively to bring about the thermal rearrangement of 2-chloroethyl diphenylphosphinite to 2-chloroethyldiphenylphosphine oxide. Heating at reduced pressures is preferred, however, since this technique gives products in higher yields.

While excesses of the two reactants are permissible, it is preferred that they be present in about stoichiometric proportions, e.g., one mole of halophosphine for each mole of hydroxyl reacting. Thus a 1:1 mole ratio of halophosphine to either the 2-halogenated ethanol or the propargyl alcohol and a 2:1 ratio of halophosphine to butynediol are desirable. Either a lesser or greater quantity of either reactant, if desired, will not decrease the efficiency of the reaction, but undue excesses, especially of the halophosphine, may lead to undesirable side reactions and/or difficulties in the purification of the final products.

The compounds coming within the scope of this invention are those in which the organic radicals are purely hydrocarbon radicals such as, for example, alkyl, cycloalkyl, aryl, alkaryl, etc. Those attached to a given phosphorus atom may be the same or different from one another. Specific subclasses of this generic representation are monovinyl tertiary phosphine oxides, phosphinylallenes, and 1,4-bis-(phosphinyl)-butadienes.

The novel α,β-unsaturated tertiary phosphine oxides of this invention are white, crystalline solids exhibiting some degree of hygroscopicity because of the highly polar nature of the phosphorus-oxygen bonds. They are comparatively stable compounds which show resistance toward oxidation, reduction, heat and hydrolysis. The compounds undergo reactions which are characteristic of those containing activated double bonds. For example, amines and alcohols are found to add readily across the activated bond to yield β-substituted alkoxy and alkylamino derivatives, respectively. The compounds may be copolymerized, using conventional radical catalysts, with vinyl comonomers. Particularly desirable copolymers are obtained with styrene and methyl methacrylate. The order of polymerizability as determined for the phenyl substituted phosphine oxides is: diphenylvinylphosphine oxide>1,4-bis-(diphenylphosphinyl)-butadiene>diphenylphosphinylallene.

The copolymers containing the tertiary phosphine oxide monomers are fire-retarding as is exemplified by their inability to burn when removed from a flame. For example, polymers containing at least about 1% by weight phosphorus have flame-retarding properties, both in the particulate form and in the form of fibers and films. Greater amounts improve these properties.

The phosphine oxide compounds described in this invention are also useful in imparting flame-retarding properties to compositions containing them. All of the compounds impart flame-retarding properties when used as additives in fireproofing compositions and flame-resistant resins.

The compounds are also of value for use in organic syntheses. Since addition reactions across the activated double bonds occur readily, these compounds offer a convenient route to the synthesis of many β-substituted derivatives of phosphine oxides, otherwise difficult to obtain. For example, 25 ml. of ethyl alcohol adds across 2.40 grams of diphenylphosphinylallene when treated with 0.23 grams of metallic sodium dissolved in 25 ml. of ethyl alcohol to provide crystals of β-ethoxy vinyl-phosphine oxide of the formula $$(C_6H_5)_2P(O)CH=C(OC_2H_5)CH_3$$

and having a melting point between 145.5° and 147° C.

When the phosphine oxides are incorporated in various coating compositions, adhesion to all surfaces, particularly metallic surfaces, is greatly enhanced. For example, a methyl methacrylate diphenylvinylphosphine oxide copolymer as prepared in Example X was formulated into a lacquer and applied over a standard type primer vehicle. Better adhesion characteristics were observed with this lacquer than with a similar formulation containing none of the phosphine oxide.

I claim:

1. The composition of matter comprising an α,β-unsaturated tertiary phosphine oxide having the structural formula:

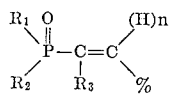

wherein each of $R_1$ and $R_2$ is one of the group consisting of aryl, alkyl, aralkyl and alkaryl; $R_3$ is one of the group consisting of hydrogen and lower alkyl; $n$ is an integer less than two; and Z is one of the group consisting of (1) when $n$ is 1,

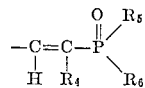

wherein $R_4$ is one of the group consisting of hydrogen and lower alkyl, and each of $R_5$ and $R_6$ is one of the group of radicals consisting of aryl, alkyl, aralkyl and alkaryl; and (2) =CH$_2$ when $n$ is 0.

2. The composition of matter comprising a phosphinyl-allene having the structural formula:

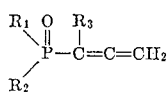

wherein each of $R_1$ and $R_2$ is one of the group of radicals consisting of aryl, alkyl, aralkyl and alkaryl, and $R_3$ is one of the group consisting of hydrogen and lower alkyl.

3. The composition of claim 2 wherein $R_1$ and $R_2$ are phenyl.

4. The composition of claim 2 wherein $R_1$ and $R_2$ are alkyl.

5. The composition of claim 4 wherein $R_1$ and $R_2$ are ethyl.

6. The composition of claim 4 wherein $R_1$ and $R_2$ are octyl.

7. The composition of matter comprising a 1,4-bis-(phosphinyl)-butadiene having the structural formula:

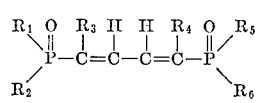

wherein each of $R_1$, $R_2$, $R_5$ and $R_6$ is one of the group of radicals consisting of aryl, alkyl, aralkyl and alkaryl and wherein each of $R_3$ and $R_4$ is one of the group consisting of hydrogen and lower alkyl.

8. A synthetic polymeric composition comprising recurring units of the formula:

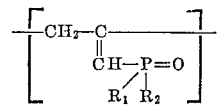

wherein each of $R_1$ and $R_2$ is one of the group consisting of aryl, alkyl, aralkyl and alkaryl.

9. A synthetic polymeric composition comprising recurring units of the formula:

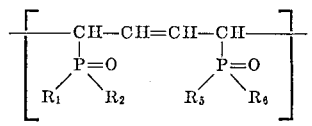

wherein each of $R_1$, $R_2$, $R_5$ and $R_6$ is one of the group consisting of aryl, alkyl, aralkyl and alkaryl.

10. A synthetic polymeric composition comprising recurring units of the formula:

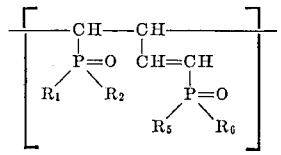

wherein each of $R_1$, $R_2$, $R_5$ and $R_6$ is one of the group consisting of aryl, alkyl, aralkyl and alkaryl.

11. The process comprising reacting (1) a disubstituted halophosphine of the formula:

wherein each of $R_1$ and $R_2$ is one of the group consisting of aryl, alkyl, aralkyl and alkaryl and X is a halogen radical selected from the group consisting of chloro, bromo and iodo; and (2) an alcohol selected from the group consisting of (a) 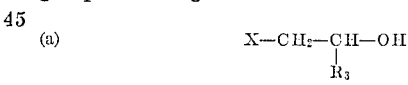

(b) 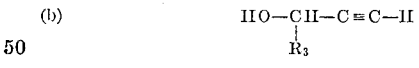

and (c) 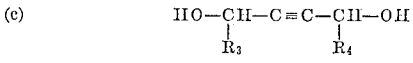

wherein X is a halogen radical selected from the group consisting of chloro, bromo, and iodo; each of $R_3$ and $R_4$ is one of the group consisting of hydrogen and lower alkyl; said reaction being in the presence of a base, to provide an α,β-unsaturated tertiary phosphine oxide; with the proviso that when the alcohol is (a), dehydrohalogenation is required to provide an α,β-unsaturated tertiary phosphine oxide.

12. The process of claim 11 wherein the base comprises a tertiary amine.

13. The process of claim 12 wherein the reaction takes place at a temperature between about −5° and about 25° C.

14. The process of claim 11 wherein the alcohol has the formula:

$$Cl-CH_2-CH_2-OH$$

15. The process of claim 11 wherein the alcohol has the formula:

$$HO-CH_2-C\equiv C-CH_2-OH$$

16. The process comprising reacting (1) a disubstituted halophosphine of the formula

wherein $R_1$ and $R_2$ are members selected from the group consisting of aryl, alkyl, aralkyl and alkaryl, and X is a halogen radical selected from the group consisting of chloro, bromo and iodo, and (2) an alcohol of the formula

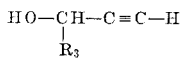

where $R_3$ is a member selected from the group consisting of hydrogen and lower alkyl, said reaction being in the presence of a base, to provide an $\alpha,\beta$-unsaturated tertiary phosphine oxide.

17. The process of claim 16 wherein $R_3$ is hydrogen.
18. The process of claim 17 wherein $R_1$ and $R_2$ are phenyl.
19. The process of claim 17 wherein $R_1$ and $R_2$ are alkyl.
20. The process of claim 19 wherein $R_1$ and $R_2$ are ethyl.
21. The process of claim 19 wherein $R_1$ and $R_2$ are octyl.
22. Process for the production of vinyl diphenylphosphine oxide which comprises heating beta-chloroethyl diphenylphosphine oxide at a temperature, and for a sufficient period of time to dehydrochlorinate the beta-chloroethyl diphenylphosphine oxide to form vinyl diphenylphosphine oxide.
23. As a new chemical intermediate the compound beta-chloroethyl diphenylphosphine oxide.
24. A solid homopolymer of vinyl diphenylphosphine oxide.

References Cited by the Examiner

UNITED STATES PATENTS 2,957,931  10/1960  Hamilton et al. _____ 260—80

OTHER REFERENCES

Razumou et al.: Chemical Abstracts, vol. 52, pages 293–4 (1958).

JOSEPH L. SCHOFER, *Primary Examiner.*

MILTON STERMAN, TOBIAS E. LEVOW, JAMES A. SEIDLECK, *Examiners.*

J. T. BROWN, L. G. CHILDERS, *Assistant Examiners.*